US009619472B2

(12) United States Patent
McCune et al.

(10) Patent No.: US 9,619,472 B2
(45) Date of Patent: Apr. 11, 2017

(54) UPDATING CLASS ASSIGNMENTS FOR DATA SETS DURING A RECALL OPERATION

(75) Inventors: Franklin Emmert McCune, Tucson, AZ (US); Miguel Angel Perez, Vail, AZ (US); David Charles Reed, Tucson, AZ (US); Max Douglas Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1200 days.

(21) Appl. No.: 12/814,404

(22) Filed: Jun. 11, 2010

(65) Prior Publication Data
US 2011/0307745 A1 Dec. 15, 2011

(51) Int. Cl.
*G06F 17/00* (2006.01)
*G06F 17/30* (2006.01)

(52) U.S. Cl.
CPC .. *G06F 17/30082* (2013.01); *G06F 17/30221* (2013.01)

(58) Field of Classification Search
CPC .............................................. G06F 17/30082
USPC ........................................................ 707/825
See application file for complete search history.

(56) References Cited

U.S. PATENT DOCUMENTS

| 5,495,603 | A | 2/1996 | Fruchtman et al. |
| 5,659,743 | A | 8/1997 | Adams et al. |
| 5,790,886 | A | 8/1998 | Allen |
| 6,131,190 | A * | 10/2000 | Sidwell .......................... 717/115 |
| 6,269,382 | B1 * | 7/2001 | Cabrera et al. |
| 8,131,689 | B2 * | 3/2012 | Tsirigotis et al. ............. 707/694 |

(Continued)

FOREIGN PATENT DOCUMENTS

JP 62274420 11/1987

OTHER PUBLICATIONS

English abstract of JP62274420 published Nov. 28, 1987.

(Continued)

*Primary Examiner* — Mariela Reyes
*Assistant Examiner* — Mohsen Almani
(74) *Attorney, Agent, or Firm* — David W. Victor; Konrad Raynes Davda & Victor LLP

(57) ABSTRACT

Provided are a computer program product, system and method for updating class assignments for data sets during a recall operation in a storage environment having a plurality of storage devices. Information on a data set is processed to determine at least one current attribute of the data set. A determination is made as to whether the determined at least one current attribute satisfies a criteria. Indication is made in a catalog to change a class associated with the data set in response to determining that the at least one current attribute satisfies the criteria, wherein the class is used to determine how to manage the data set. The data set is migrated from a first storage to a second storage. A recall operation is initiated to recall the data set from the second storage. In response to the recall operation and determining that the catalog indicates to change the class associated with the data set, the catalog is processed to determine whether to change the class for the data set from a first class to a second class and a management operation is performed on the data set to conform the data set to the second class when recalling the data set.

20 Claims, 6 Drawing Sheets

(56) References Cited

U.S. PATENT DOCUMENTS

| | | |
|---|---|---|
| 2003/0149835 A1 | 8/2003 | Allen et al. |
| 2003/0149847 A1 | 8/2003 | Shyam et al. |
| 2004/0243699 A1* | 12/2004 | Koclanes et al. ............ 709/224 |
| 2005/0289152 A1 | 12/2005 | Earl et al. |
| 2007/0079099 A1 | 4/2007 | Eguchi |
| 2009/0094413 A1 | 4/2009 | Lehr et al. |

OTHER PUBLICATIONS

"Storage Management Automation", IP.com, Technical Disclosure, IP.com No. IPCOM000143254D, Nov. 17, 2006, pp. 1-2.

M. Lovelace, et al., "z/OS V1R3 DFSMS Technical Guide", IBM Corporation, Document SG24-6569-00, Jul. 2002, pp. 1-220.

"DFSMS Storage Administration Reference (for DFSMSdfp, DFSMSdss, DFSMShsm)", IBM Corporation, Document SC26-7402-09, Apr. 2008, pp. 1-1570.

* cited by examiner

Data Set Information

Storage Group Information

Catalog Information

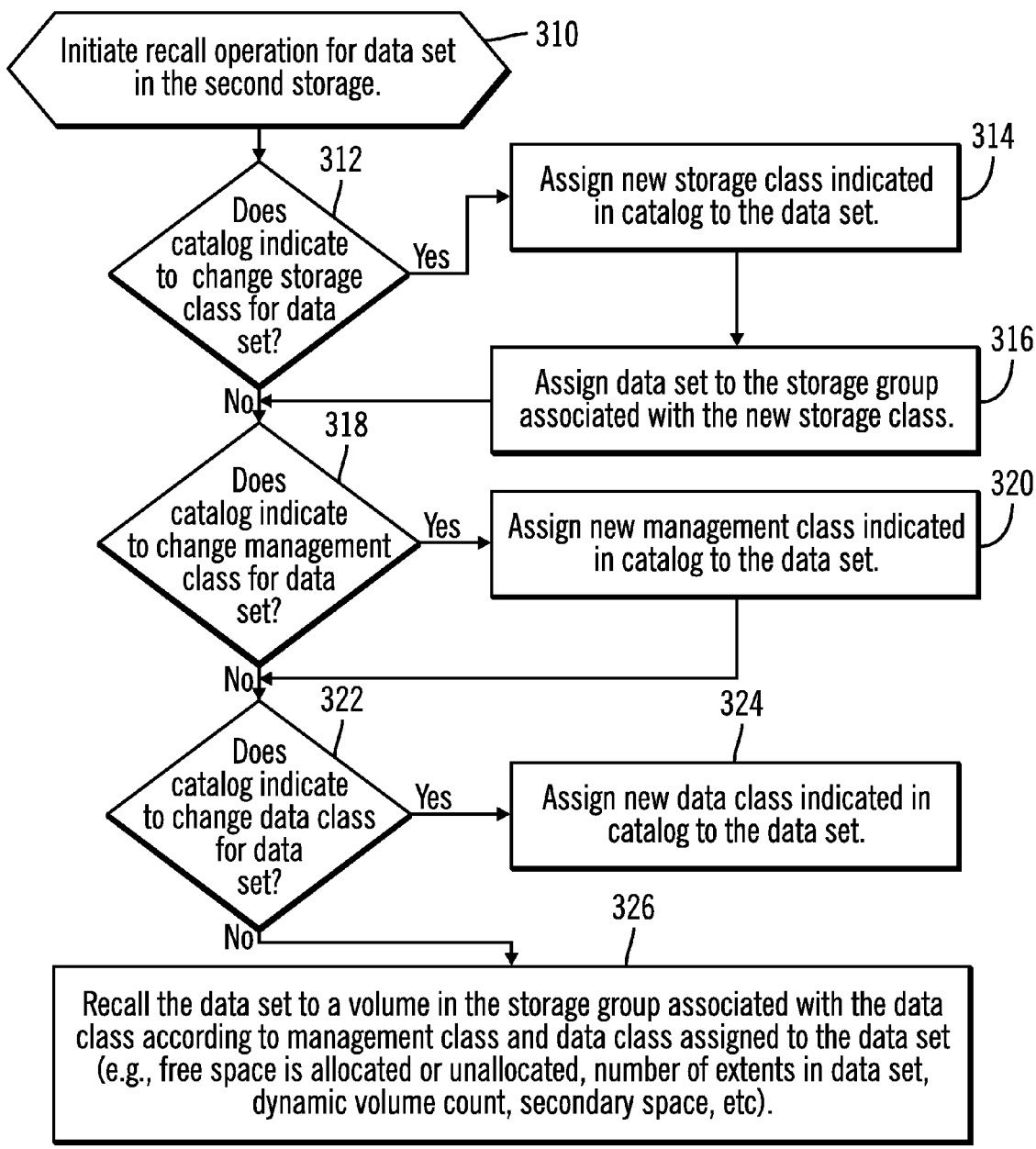

UPDATING CLASS ASSIGNMENTS FOR DATA SETS DURING A RECALL OPERATION

BACKGROUND OF THE INVENTION

1. Field of the Invention

The present invention relates to a method, system, and computer program product for updating class assignments for data sets during a recall operation.

2. Description of the Related Art

A policy based storage management framework specifies how data having certain characteristics is associated with different pools of storage space that will store such data, as well as how the data will be managed throughout its lifecycle. A policy based storage management framework provides constructs including data classes, storage classes, and management classes that are used to select storage devices and settings for a data set based on the characteristics of the data set. A data class specifies data set logical attributes, such as data file type, record length, logical data storage space requirements, expiration and retention dates for the data, etc. A storage class defines a set of storage services, such as random access specifications, sequential access specifications, guaranteed space, performance criteria, etc. A management class specifies availability and retention management requirements for data, such as hierarchical storage management (HSM), expiration, backup frequency, retention of backup copies, etc.

An automatic class selection (ACS) routine receives a request to create or access a data set and then selects and assigns data, storage, and management classes that apply to the data set based on characteristics of the data set, e.g., application that generated data set, data set name, date, owner of data set and/or application, etc. The final selection is of a storage group based on the data, storage, and management classes assigned to the data set. The storage group provides the allocation of physical storage space for the data sets Data sets can be members of one data class, but be assigned to different storage and/or management classes, which determine to which storage group the data file is assigned.

Over time, system demands may change, and the appropriate data, storage, and management classes for a data set may have changed as attributes of the data set have changed, such as available space, I/O activity directed to the data set, free space errors, etc. For instance, when the ACS routine was written, an application may have been able to use the data set successfully with a standard data set size of four gigabytes. Over time the same application is required to save more then four gigabytes of data causing the data set allocation to fail due to the data set system limitation. At this point the customer has to take action to alter the assigned data class so that the extended addressability attribute is specified. This extended addressability attribute is a feature that allows a data set to exceed its original data set system limitation. However, in most cases it is difficult for customers to identify how to rectify system limitations and performance problems caused by increased system work load. Further, the customer may have a new release of the operating system and storage manager with new features that could benefit the customer's environment however the feature is never implemented.

SUMMARY

Provided are a computer program product, system and method for updating class assignments for data sets during a recall operation in a storage environment having a plurality of storage devices. Information on a data set is processed to determine at least one current attribute of the data set. A determination is made as to whether the determined at least one current attribute satisfies a criteria. Indication is made in a catalog to change a class associated with the data set in response to determining that the at least one current attribute satisfies the criteria, wherein the class is used to determine how to manage the data set. The data set is migrated from a first storage to a second storage. A recall operation is initiated to recall the data set from the second storage. In response to the recall operation and determining that the catalog indicates to change the class associated with the data set, the catalog is processed to determine whether to change the class for the data set from a first class to a second class and a management operation is performed on the data set to conform the data set to the second class when recalling the data set.

BRIEF DESCRIPTION OF THE DRAWINGS

FIG. 9 illustrates an embodiment of an operation to migrate a data set.

FIG. 10 illustrates an embodiment of operations to recall a data set.

DETAILED DESCRIPTION

Figure 1:
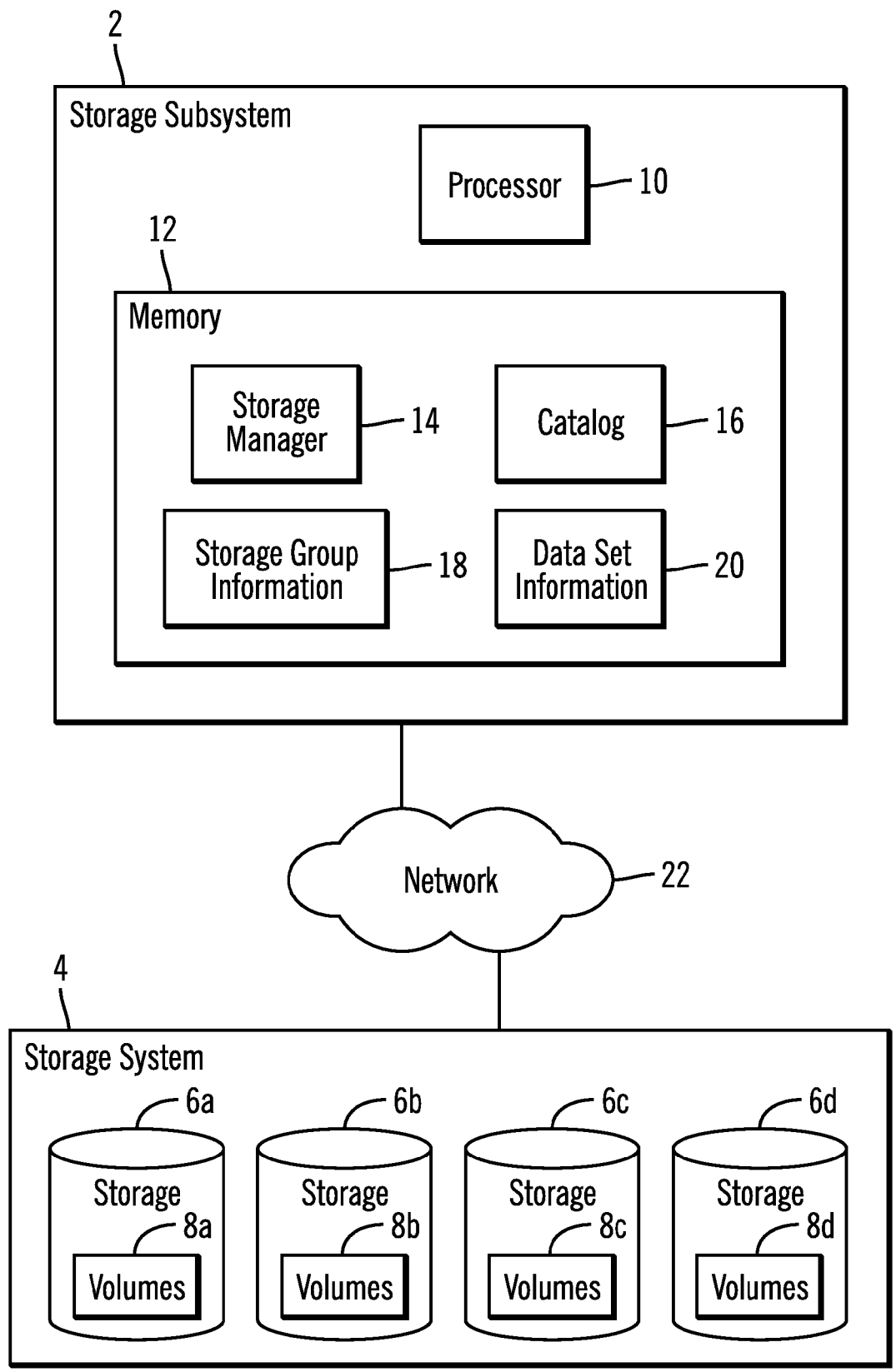
FIG. 1 illustrates an embodiment of a storage environment.

FIG. 1 illustrates an embodiment of a storage subsystem 2 providing Input/Output ("I/O") access to a storage system 4 having a plurality of storages 6a, 6b, 6c, 6d each having volumes 8a, 8b, 8c, 8d. The storage subsystem 2 includes a processor 10 and memory 12. The memory 12 includes a storage manager 14 that manages migration and recall of data sets in the volumes 8a, 8b, 8c, 8d and selects storage resources to store the data sets. The memory 12 stores data structures used by the storage manager 14, including a catalog 16 providing information on data sets migrated from one volume to another and storage group information 18 having information on storage attributes of the storages 6a, 6b, 6c, 6d and volumes 8a, 8b, 8c, 8d, such as performance, I/O throughput, Redundant Array of Independent Disk (RAID) configuration, striping configuration, redundancy, etc. The memory 12 further has data set information 20 on the data sets in the volumes, including attributes and classes assigned to the data sets, such as a data class, storage class and management class.

The storage subsystem 2 may communicate with the storages 6a, 6b, 6c, 6d over a network 22, such as a local area network (LAN), storage area network (SAN), wireless network, peer-to-peer network, the Internet, and Intranet, direct connections, bus interface, etc.

A data set is associated with attributes that represent properties and characteristics of the managed environment (e.g. capacity of a disk, throughput rates, unused space, I/O activity). Attributes may be intrinsic (static) and dynamic (time-varying). Intrinsic attributes do not change with time and hence they can be referenced but not reset. Dynamic attributes can be referenced and can be reset.

A data class specifies data attributes of the data set, such as the data's life cycle, recoverability, security, number of extents in the data set, whether the data set is to be allocated in the extended format, whether the data set is a hierarchical file system (HFS) data set, a data set record format, the record length, a primary allocation of records, a secondary allocation of records, dynamic volume count (the maximum number of volumes a data set can span), etc.

Storage classes are a list of storage objectives and requirements that represent a list of services available to data sets. A storage class does not represent a physical storage, but provides the criteria the storage manager 14 uses to determine the physical storage to allocate to store the data set. Storage classes concern the partitioning and use of storage space, the topology of storage within an enterprise, and the management of the storage components themselves. Storage attributes may provide requirements on the storage device, or the storage systems (e.g., a number of storage devices packaged as a system), data striping across RAID arrays, allocation of a volume that supports concurrent copy, virtual copies, specific "snapshot" implementations, dynamic defragmentation/garbage collection, on-board cache management, performance-based capacity control, etc.). Storage attributes that are device related include capacity, bandwidth, I/O rates, sequential/direct, reliability/error rates, concurrent copy capability, physical location, security, lease duration, cost, etc. The storage class assigned to a data set can be used to select a storage group from which a volume is selected to store the data set. A storage group represents the physical storage, such as collections of hard disk drives including volumes, volumes in tape libraries, etc. Thus, the storage class attributes can be used to select a storage group having storage attributes that satisfy the requirements of the storage class.

A management class indicates how to manage the data in the data set, such as attributes concerning migration, backup, retention, expiration, frequency of backup, whether unused space in the data set is allocated to the data set or unallocated and only allocated when needed.

The storage subsystem 2 may comprise a storage server, such as an enterprise storage server, a workstation, etc. Each storage 6a, 6b, 6c, 6d may be comprised of one or more storage devices, where the storage devices may comprise as a solid state storage device comprised of solid state electronics, such as a EEPROM (Electrically Erasable Programmable Read-Only Memory), flash memory, flash disk, storage-class memory (SCM), etc., magnetic storage disk, an array of disks, optical disk, tape, etc. The storages 6a, 6b, 6c, 6d may be implemented in a distributed storage environment or network storage environment, such as "cloud" storage. Alternatively, the storages 6a, 6b, 6c, 6d may be implemented at a single location. The memory 12 may comprise one or more volatile or non-volatile memory devices.

The storage manager 14 may be implemented as code in a computer readable storage medium executed by a processor 10 as shown in FIG. 1. Alternatively, the storage manager 14 may be implemented with hardware logic, such as an Application Specific Integrated Circuit (ASIC). The storage manager 14 may be part of an operating system for the storage subsystem 2 or comprise a separate storage facility of the operating system, such as the Data Facility Storage Management Subsystem (DFSMS) provided by International Business Machines Corporation ("IBM"). DFSMS provides an operating environment to automate and centralize the management of storage, data management program, management device management.

In certain embodiments, the storage manager 14 may implement an automatic class selection (ACS) routine that receives a request to create or access a data set and then selects and assigns data, storage, and management classes that apply to the data set based on characteristics of the data set, e.g., application that generated data file, file name, date, owner of file and/or application, etc. A storage group for a data set is selected based on the data, storage, and management classes assigned to the data. The storage group provides the allocation of physical storage space for the data file. Data sets can be members of one data class, but be assigned to different storage and/or management classes, which determine to which storage group the data file is assigned.

Figure 2:
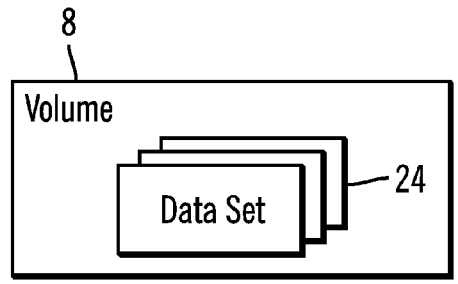
FIG. 2 illustrates an embodiment of a storage volume including data sets.

FIG. 2 illustrates how a volume 8, such as volumes 8a, 8b, 8c, 8d, include one or more data sets 24. A data set 24 is comprised of a number of extents of storage locations assigned to the data set. The data sets 24 may be indexed according to a primary key that is used to locate records in the data set 24.

Figure 3:
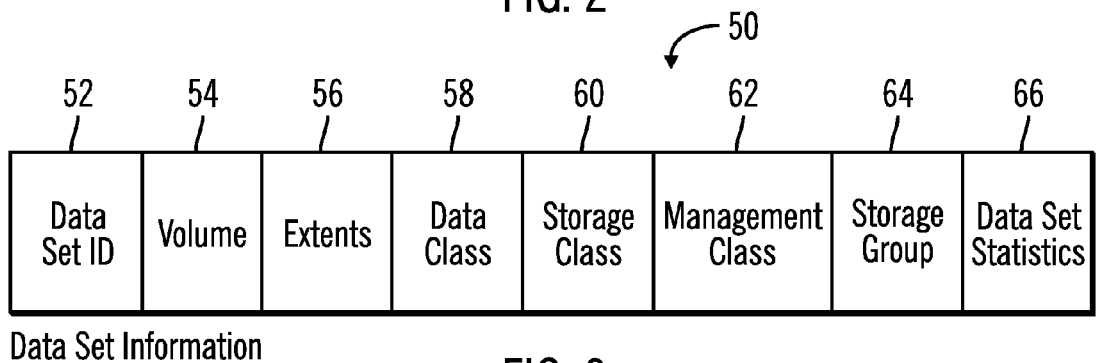
FIG. 3 illustrates an embodiment of data set information.

FIG. 3 illustrates an embodiment of an instance of data set information 50 for one data set 24 the storage manager 14 maintains in the data set information 20. A data set identifier (ID) 52 identifies the data set, a volume field 54 indicates the volume 8a, 8b, 8c, 8d in which the data set is stored, and the extents 56 indicate the extents of a data set. The data set information 50 further indicates the data class 58, storage class 60, management class 62, and storage group 64 assigned to the data set, where the storage group 64 is assigned based on the requirements and attributes specified by the storage class 60. The storage manager 14 further maintains data set statistics 66 concerning current I/O activity at the data set, available space, and other historical access information for the data set 24 that may be used to determine the appropriate data, storage, and management classes to assign to the data set 24.

Figure 4:
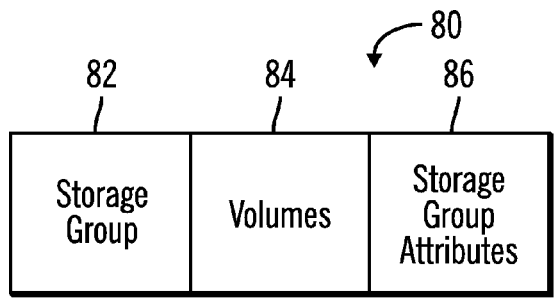
FIG. 4 illustrates an embodiment of storage group information.

FIG. 4 illustrates an embodiment of an instance of storage group information 80 for one storage group the storage manager 14 maintains in the storage group information 18. The storage group information 80 for one storage group includes a storage group identifier 82, volumes 84 associated with the storage group, and storage group attributes 86 providing storage attributes and requirements satisfied by the volumes 84 assigned to the storage group.

Figure 5:
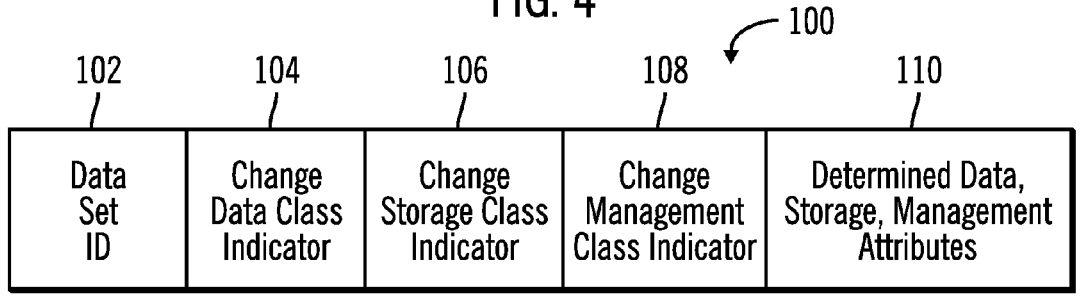
FIG. 5 illustrates an embodiment of catalog information.

FIG. 5 illustrates an embodiment of an instance of catalog information 100 the storage manager maintains in the catalog 16 for one data set migrated 24 from a volume 8a, 8b, 8c, 8d in a first storage, e.g., 6a, 6b, 6c, 6d, to a volume 8a, 8b, 8c, 8d in a second storage, e.g., 6a, 6b, 6c, 6d. The catalog information 100 includes a data set ID 102 and change class indicators 104, 106, 108 indicating whether the data class, storage class and/or management class, respectively, needs to be changed when the data set is recalled from the volume due to currently determined attributes of the data set. The determined data, storage, and management attributes 110 comprises information on current data set attributes gathered as part of the operation to determine whether the data set 24 classes need to be updated.

Figure 6:
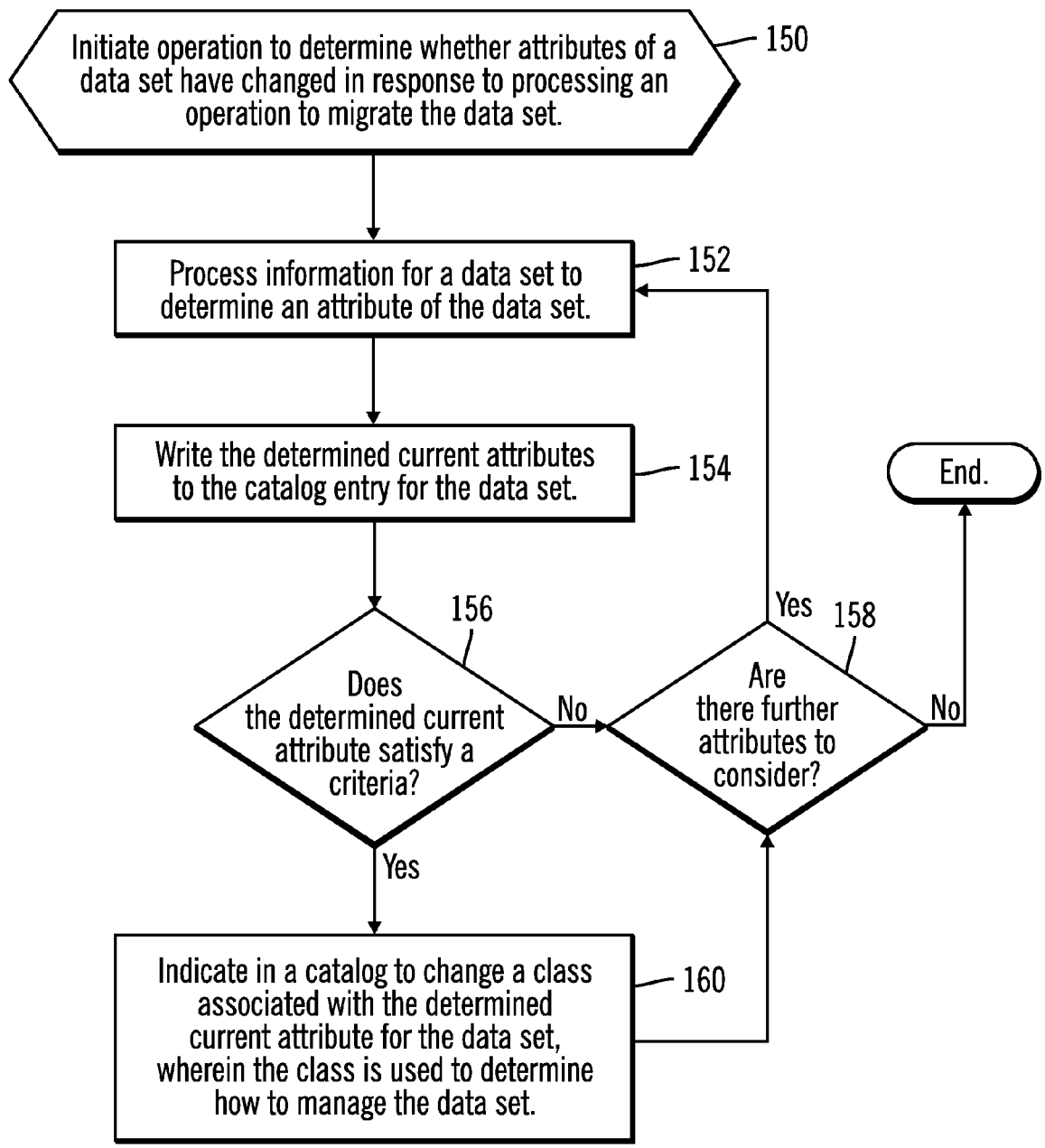
FIG. 6 illustrates an embodiment of operations to determine whether attributes of a data set have changed.

FIG. 6 illustrates an embodiment of operations performed by the storage manager 14 to determine whether attributes of a data set 24 have changed in response to processing an operation to migrate the data set. In alternative embodiments, the operations to determine whether attributes of a data set 24 have changed may be performed at other times, such as in response to an error or upon detecting a condition. Upon initiating (at block 150) an operation to determine whether attributes of a data set 24 have changed, the storage manager 24 processes (at block 152) data set information to determine current attributes for the data set, such as the data set statistics 66. The determined current attributes may comprise a current I/O activity at the data set, I/O activity at the volume including the data set, unused space, etc. The storage manager 14 writes (at block 154) the determined current attributes to the catalog information 100 for the data set in the determined attributes field 110. If (at block 156) a determined current attribute satisfies a criteria indicating a problem or limitation of the current implementation of the data set 24, then the storage manager 14 indicates (at block 160) in the catalog 16 to change a class associated with the determined current attribute for the data set. The indication to change the particular class type may be indicated in the change data class 104, storage class 106, and management class 108. This indicates which specific class types need to be changed to reflect the current determined attributes of the data set 24. As discussed, the classes are used to determine how to manage the data set, such as which storage group to use, configuration settings, etc. The change indicators 104, 106, 108 may comprise a specific code, such as by setting a class to AUTO. From block 160 or the no branch of block 156, the storage manager 14 determines (at block 158) whether there are further attributes to consider and, if so, control proceeds back to block 152 to consider the next attribute, else control ends.

Figure 7:
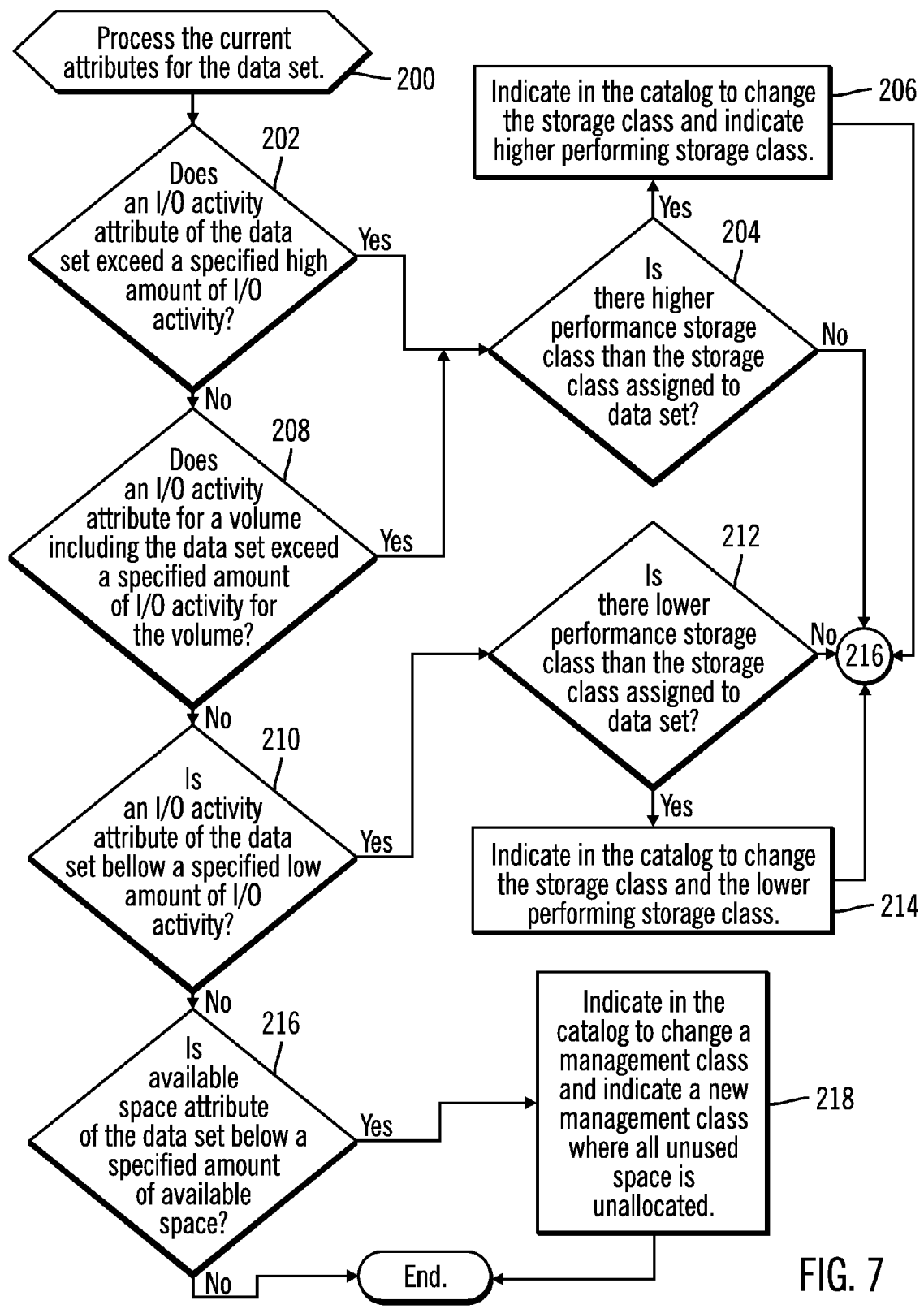
FIG. 7 illustrates an embodiment of operations to indicate to change classes assigned to a data set.

FIG. 7 illustrates an embodiment of operations performed by the storage manager 14 to perform the operations at blocks 152-160 for specific types of attributes of the data set 24. To process the current attributes for the data set (at block 200), the storage manager 14 determines (at block 204) whether a current I/O activity attribute of the data set 24 exceeds a specified high amount of I/O activity, which comprises a storage attribute. If (from the yes branch of block 202) I/O activity is high, then the storage manager 14 determines (at block 204) whether there is a higher performance storage class than the storage class currently assigned to the data set 24. If so, then the storage manager 14 indicates (at block 206) in the catalog information 100 for the data set to change the storage class 106 and indicates the higher performing storage class that should be used. The storage manager 14 may further store the gathered attributes in the determined attributes 110 field. If there is no higher performance storage class to handle the increased I/O activity, then control ends (from the no branch of block 204) because there is no higher storage class available to assign to improve I/O performance. In such case, the storage class 60 for the data set 24 remains the same.

From the no branch of block 202, the storage manager 14 may determine (at block 208) whether an I/O activity attribute for a volume including the data set 24 exceeds a specified amount of I/O activity for the volume. The current I/O activity attribute for the volume may be determined from volume information statistics maintained by the storage manager 14. If the volume I/O activity exceeds the threshold (from the yes branch of block 208) then control proceeds to block 204 to determine whether there is a higher performing storage class available to assign to the data set. If I/O activity is not high for the data set and the volume (from the no branch of block 208), then the storage manager 14 may determine (at block 210) whether the I/O activity for the data set 24 is below a specified low threshold. If so, then the storage manager 14 determines (at block 212) whether there is a lower performing storage class than the storage class 60 currently assigned to the data set 24. If (from the yes branch of block 212) there is a lower performing storage class, then the storage manager 14 indicates (at block 214) in the catalog 16 the lower performing storage class to use. The storage manager 14 may further store the gathered attributes in the determined attributes 110 field. If there is no lower performance storage class suitable for the low I/O activity, then control ends (from the no branch of block 212) because there is no higher storage class available to assign to improve I/O performance. In such case, the storage class 60 for the data set 24 remains the same.

After determining whether to change the storage class for the data set (from block 206, the no branch of block 204, the no branch of block 210, the no branch of block 212, or block 214), the storage manager 14 determines (at block 216) whether an available space attribute of the data set is below a specified amount of available space. If available space is low, then the storage manager 14 indicates (at block 218) in the catalog 14 to change a management class for the data set 24 and indicate a new management class where all unused space is unallocated. The indication to change the management class may be made by setting the change management class indicator 108.

With the described embodiments of FIGS. 6 and 7, indication is made to change the class and the new class is indicated, but the new class is not yet assigned until a later point, such as when the data set 24 is recalled from a storage 6a, 6b, 6c, 6d.

Figure 8:
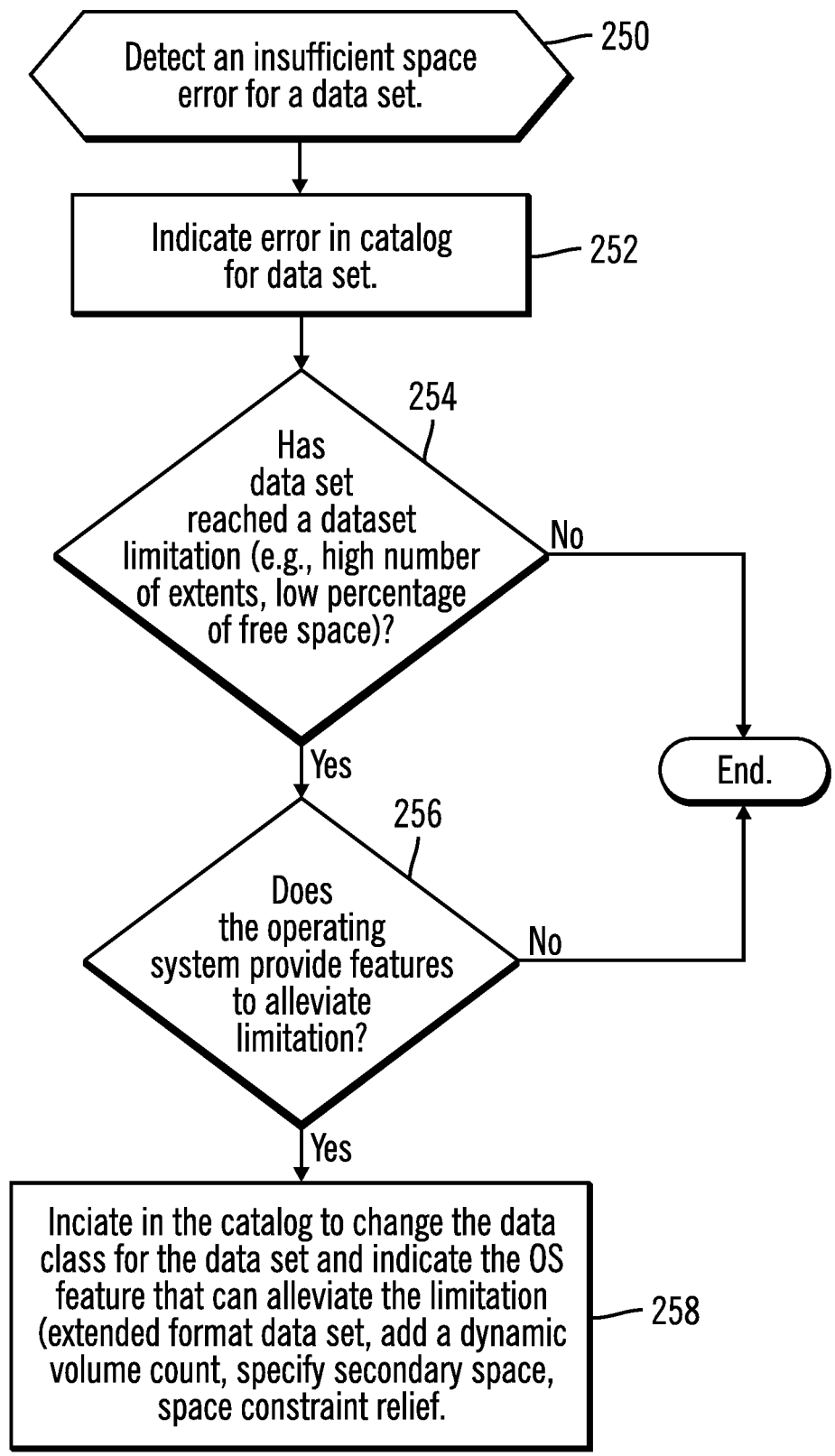
FIG. 8 illustrates an embodiment of operations to indicate to change a class for a data set in response to detecting an error.

FIG. 8 illustrates an embodiment of operations performed by the storage manager 14 to indicate to change a class associated with the data set 24 in response to an event, such as an error. In response to detecting (at block 250) an insufficient space error for a data set 24, the storage manager 14 indicates (at block 252) an error in the catalog entry 100 for the data set. If (at block 254) the data set 24 has reached a dataset limitation, such as a high number of extents, low percentage of free space, etc., then the storage manager 14 determines (at block 256) whether the operating system or other storage manager 14 feature provides capabilities to alleviate the detected limitation. If so (from the yes branch of block 256), then the storage manager 14 indicates in the catalog 14 to change the data class for the data set, such as by setting the change data class indicator 104, and indicate the operating system or storage management feature that can alleviate the limitation, such as an extended format data set, add a dynamic volume count, specify secondary space, space constraint relief, etc. Otherwise, if a data set limitation has not been reached (from the no branch of block 254) or the operating system does not provide a feature to alleviate the limitation (from the no branch of block 256), then control ends.

For instance, if there is an insufficient space error, such as an abnormal end (ABEND), a high number of extents, or low percentage of free space, the storage manager 14 may determine whether the data set 24 has reached a dataset limitation and, if so, review all operating system features available that could aid with that limitation. As an example, if a sequential dataset failed to be created because the allocation would exceed the limitation of 16 extents, then the storage manager 14 may invoke a data management product to create a replacement dataset with the extended format attribute that will elevate the extent limit. With the extended format attribute, the dataset can allocate additional extents per volume. Another example would be to elevate dataset failures during end of volume (EOV) processing and ABENDs. The storage manager 14 can add a dynamic volume count to elevate space failures and ABENDs that occur during EOV processing. The storage manager 14 may further specify a secondary space amount to overcome certain ABENDs. Further, the storage manager 14 may enable space constraint relief to relieve an insufficient space condition ABEND. In these error situations, the change data class indicator 104 is set to indicate to change the data class and configure the data set to utilize these extended features when later recalled.

FIG. 9 illustrates an embodiment of an operation performed by the storage manager 14 to migrate a data set 14 from a first volume 8*a*, 8*b*, 8*c*, 8*d* in a first storage 6*a*, 6*b*, 6*c*, 6*d* to a second volume 8*a*, 8*b*, 8*c*, 8*d* in a second storage 6*a*, 6*b*, 6*c*, 6*d* and recall the data set 24 from the second storage. At block 300, the storage manager 14 migrates a data set 24 from a first storage volume to the second storage volume. In one embodiment, the storage manager 14 may perform the operations in FIGS. 6 and 7 to determine whether to indicate classes to change. Further, the migration operation may be performed as part of a hierarchical storage management (HSM) implementation where infrequently accessed data sets are migrated to a lower performance storage system where they are maintained until later accessed.

FIG. 10 illustrates an embodiment of operations performed by the storage manager 14 to recall a data set. Upon initiating (at block 310) a recall operation for a data set 24 in the second storage, the storage manager 14 determines (at block 312) whether the catalog information 100 for the data set 24 indicates to change the storage class 60 for the data set 24, which can be indicated by the change storage class indicator 106. If so, the storage manager 14 assigns (at block 314) the new storage class indicated in the catalog information 100 to the storage class 60 (FIG. 3) for the data set 24 indicated in the data set information 50. The storage manager 14 further assigns (at block 316) the data set 24 to a storage group having storage group attributes 80 (FIG. 4) that satisfy the requirements and storage attributes of the new storage class, and indicates the storage group in the storage group field 64 for the data set information 50. The storage manager 14 determines (at block 318) whether the catalog information 100 for the data set indicates to change the management class 62 for the data set 24, which can be indicated by the change management class indicator 108. If so, the storage manager 14 assigns (at block 320) the new management class indicated in the catalog information 100 to the data set 24 and indicates the new assignment in the management class field 62 in the data set information 50. The storage manager 14 determines (at block 322) whether the catalog information 100 for the data set indicates to change the data class 58 for the data set 24, which can be indicated by the change data class indicator 104. If so, the storage manager 14 assigns (at block 324) the new data class indicated in the catalog information 100 for the data set 24 and updates the data class 58 for the data set in the data set information 50 with the new data class assignment.

The storage manager 14 recalls (at block 326) the data set 24 to a volume in the storage group associated with the data class according to management class and data class attributes assigned to the data set (e.g., free space is allocated or unallocated, number of extents in data set, dynamic volume count, secondary space, etc). In this way, any detected changes to attributes requiring changes to the classes assigned to the data set 24 may be determined as part of migration or before migration but implemented at the time of recall when the data set is recalled to a volume, such that the data set is recalled to a volume that satisfies the current attributes of the data set.

Described embodiments indicate changes that need to be made to the data, storage and management classes for a data set and implement those changes when the data set is recalled following migration. The described embodiments provide for determining to change and update the assignment of classes to data sets during migration and recall to limit interfering with application access to the data set.

ADDITIONAL EMBODIMENT DETAILS

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code for carrying out operations of the described embodiments may further be implemented in a hardware device comprising hardware logic, such as an integrated circuit chip, Programmable Gate Array (PGA), Application Specific Integrated Circuit (ASIC), etc.

Yet further, the program code for carrying out operations of the described embodiments may further be implemented in a combination of a hardware device and a computer readable storage medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6-9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for managing data sets in a storage environment having a plurality of storage devices including a first storage and a second storage, the computer program product comprising at least one of computer readable storage medium having computer readable program code embodied therein and a hardware device that executes to perform operations, the operations comprising:

processing information on a data set to determine at least one current attribute of the data set;

determining whether the determined at least one current attribute satisfies a criteria;

indicating in a catalog to change a class associated with the data set in response to determining that the at least one current attribute satisfies the criteria, wherein the class is used to determine how to manage the data set;

migrating the data set from the first storage to the second storage in the storage environment;

initiating a recall operation to recall the data set from the second storage after the migration and indicating the change in the catalog, wherein indication to change the class associated with the data set is determined as part of migration or before migration and implemented at the time of the recall operation when the data set is recalled; and in response to the recall operation and determining that the catalog indicates to change the class associated with the data set, performing:

processing the catalog to determine to change the class for the data set from a first class to a second class; and performing a management operation on the data set to conform the data set to the second class when recalling the data set.

2. The computer program product of claim 1, wherein the first storage is in a first storage group, wherein the class comprises a storage class and the first class and second class comprise first and second storage classes, wherein the second storage class requires higher performance storage attributes than the first storage class, and wherein the management operation comprises recreating the data set in a volume in a third storage in a second storage group satisfying the higher performance storage of the second storage class.

3. The computer program product of claim 2, wherein one of the at least one current attribute comprises Input/Output (I/O) activity at the data set, wherein the criteria indicates a specified amount of I/O activity, and wherein the indication is made to change the storage class of the data set to the second storage class in response to determining that the I/O activity at the data set exceeds the specified amount of I/O activity.

4. The computer program product of claim 2, wherein one of the at least one current attribute comprises Input/Output (I/O) activity at a volume including the data set, wherein the criteria indicates a specified amount of I/O activity at the volume including the data set, and wherein the indication is made to change the storage class of the data set to the second storage class in response to determining that the I/O activity at the volume exceeds the specified amount of I/O activity at the volume.

5. The computer program product of claim 1, wherein one of the at least one current attribute comprises available space in the data set, wherein the criteria indicates a specified amount of available space, wherein determining whether the determined attribute of the data set satisfies the criteria comprises determining whether the available space at the data set exceeds the specified amount of available space, wherein the first class comprises a first management class and the second class comprises a second management class, wherein the second management class specifies that the data set is to have unused space unallocated, and wherein the management operation performed on the data set comprises recalling the data set to have a management attribute indicating that all unused space in the data set is unallocated.

6. The computer program product of claim 1, wherein the management operation recalls the data set to a third storage compatible with the second class by:

selecting the third storage having a higher storage performance than a storage performance of the first storage in response to determining that Input/Output (I/O) activity at the data set exceeds a specified high threshold of I/O activity; and selecting the third storage having a lower storage performance than a storage performance classification of the first storage in response to determining that the I/O activity for the data set is less than a low threshold amount of I/O activity.

7. The computer program product of claim 1, wherein the determining of whether the determined at least one current attribute satisfies the criteria and indicating in the catalog to change the class associated with the data set are performed in response to migrating the data set to the second storage.

8. The computer program product of claim 1, wherein the operations further comprise:

detecting an error with respect to the data set, wherein the determining of whether the determined attribute satisfies the criteria and indicating in the catalog to change the class associated with the data set are performed in response to detecting the error.

9. The computer program product of claim 8, wherein the error indicates insufficient space in the data set, and wherein the management operation recalls the data set to a replacement data set having a greater number of extents than the data set that was migrated to the second storage.

10. A system in communication for managing data sets in a storage environment having a plurality of storage devices including a first storage and a second storage, comprising:

a processor;

a computer readable medium including information on data sets and a catalog; and a computer readable storage medium having a storage manager executed by the processor to perform operations, the operations comprising:

processing the information on a data set to determine at least one current attribute of the data set;

determining whether the determined at least one current attribute satisfies a criteria;

indicating in the catalog to change a class associated with the data set in response to determining that the at least one current attribute satisfies the criteria, wherein the class is used to determine how to manage the data set;

migrating the data set from the first storage to the second storage in the storage environment;

initiating a recall operation to recall the data set from the second storage after the migration and indicating the change in the catalog, wherein indication to change the class associated with the data set is determined as part of migration or before migration and implemented at the time of the recall operation when the data set is recalled; and in response to the recall operation and determining that the catalog indicates to change the class associated with the data set, performing:

processing the catalog to determine to change the class for the data set from a first class to a second class; and performing a management operation on the data set to conform the data set to the second class when recalling the data set.

11. The system of claim 10, wherein the first storage is in a first storage group, wherein the class comprises a storage class and the first class and second class comprise first and second storage classes, wherein the second storage class requires higher performance storage attributes than the first storage class, and wherein the management operation comprises recreating the data set in a volume in a third storage in a second storage group satisfying the higher performance storage of the second storage class.

12. The system of claim 11, wherein one of the at least one current attribute comprises Input/Output (I/O) activity at the data set, wherein the criteria indicates a specified amount of I/O activity, and wherein the indication is made to change the storage class of the data set to the second storage class in response to determining that the I/O activity at the data set exceeds the specified amount of I/O activity.

13. The system of claim 10, wherein one of the at least one current attribute comprises available space in the data set, wherein the criteria indicates a specified amount of available space, wherein determining whether the determined attribute of the data set satisfies the criteria comprises determining whether the available space at the data set exceeds the specified amount of available space, wherein the first class comprises a first management class and the second class comprises a second management class, wherein the second management class specifies that the data set is to have unused space unallocated, and wherein the management operation performed on the data set comprises recalling the data set to have a management attribute indicating that all unused space in the data set is unallocated.

14. The system of claim 10, wherein the determining of whether the determined at least one current attribute satisfies the criteria and indicating in the catalog to change the class associated with the data set are performed in response to migrating the data set to the second storage.

15. The system of claim 10, wherein the operations further comprise:
detecting an error with respect to the data set, wherein the determining of whether the determined attribute satisfies the criteria and indicating in the catalog to change the class associated with the data set are performed in response to detecting the error.

16. A computer implemented method for managing data sets in a storage environment having a plurality of storage devices, comprising:
processing information on a data set to determine at least one current attribute of the data set;
determining whether the determined at least one current attribute satisfies a criteria;
indicating in a catalog to change a class associated with the data set in response to determining that the at least one current attribute satisfies the criteria, wherein the class is used to determine how to manage the data set;
migrating the data set from a first storage to a second storage;
initiating a recall operation to recall the data set from the second storage after the migration and indicating the change in the catalog, wherein indication to change the class associated with the data set is determined as part of migration or before migration and implemented at the time of the recall operation when the data set is recalled; and
in response to the recall operation and determining that the catalog indicates to change the class associated with the data set, performing:
processing the catalog to determine to change the class for the data set from a first class to a second class; and
performing a management operation on the data set to conform the data set to the second class when recalling the data set.

17. The method of claim 16, wherein the first storage is in a first storage group, wherein the class comprises a storage class and the first class and second class comprise first and second storage classes, wherein the second storage class requires higher performance storage attributes than the first storage class, and wherein the management operation comprises recreating the data set in a volume in a third storage in a second storage group satisfying the higher performance storage of the second storage class.

18. The method of claim 17, wherein one of the at least one current attribute comprises Input/Output (I/O) activity at the data set, wherein the criteria indicates a specified amount of I/O activity, and wherein the indication is made to change the storage class of the data set to the second storage class in response to determining that the I/O activity at the data set exceeds the specified amount of I/O activity.

19. The method of claim 16, wherein the determining of whether the determined at least one current attribute satisfies the criteria and indicating in the catalog to change the class associated with the data set are performed in response to migrating the data set to the second storage.

20. The method of claim 16, further comprising:
detecting an error with respect to the data set, wherein the determining of whether the determined attribute satisfies the criteria and indicating in the catalog to change the class associated with the data set are performed in response to detecting the error.

* * * * *